(12) United States Patent
Khasawneh

(10) Patent No.: US 12,722,696 B1
(45) Date of Patent: Sep. 1, 2026

(54) CASCADED OPTIMAL ROBUST CONTROLLER FOR TRAJECTORY FOLLOWING IN AUTONOMOUS VEHICLES

(71) Applicants: FCA US LLC, Auburn Hills, MI (US); Stellantis Auto SAS, Poissy (FR)

(72) Inventor: Lubna S. Khasawneh, Auburn Hills, MI (US)

(73) Assignees: FCA US LL, Auburn Hills, MI (US); Stellantis Auto SAS, Poissy (FR)

( * ) Notice: Subject to any disclaimer, the term of this patent is extended or adjusted under 35 U.S.C. 154(b) by 0 days.

(21) Appl. No.: 19/189,542

(22) Filed: Apr. 25, 2025

(51) Int. Cl.

| | |
|---|---|
| ***B62D 6/00*** | (2006.01) |
| ***B60W 10/20*** | (2006.01) |
| ***B60W 50/00*** | (2006.01) |
| ***B60W 60/00*** | (2020.01) |
| *B60W 40/10* | (2012.01) |

(52) U.S. Cl.

CPC ............ *B62D 6/003* (2013.01); *B60W 10/20* (2013.01); *B60W 50/00* (2013.01); *B60W 60/001* (2020.02); *B60W 40/10* (2013.01); *B60W 2050/0012* (2013.01); *B60W 2050/0025* (2013.01); *B60W 2520/06* (2013.01); *B60W 2520/14* (2013.01); *B60W 2552/30* (2020.02);

(Continued)

(58) Field of Classification Search

CPC ..... B62D 6/003; B60W 60/001; B60W 10/20; B60W 50/00; B60W 2552/30; B60W 40/10; B60W 2050/0012; B60W 2050/0025; B60W 2520/06; B60W 2520/14; B60W 2710/202; B60W 2710/207

See application file for complete search history.

(56) References Cited

U.S. PATENT DOCUMENTS

2019/0359251 A1* 11/2019 Shimokawabe ..... B62D 5/0466
2022/0206498 A1 6/2022 Yu (Continued)

FOREIGN PATENT DOCUMENTS

CN 110155031 A 8/2019

OTHER PUBLICATIONS

Kang, Chang Mook et al., "Cascade Backstepping Control With Augmented Observer for Lateral Control of Vehicle", Digital Object Identifier 10.1109/ACCESS.2021.3066444, vol. 9, p. 45367-45376. Mar. 29, 2021.

(Continued)

*Primary Examiner* — Hussein Elchanti
(74) *Attorney, Agent, or Firm* — Jeremy J. Klobucar

(57) ABSTRACT

A cascaded two-level lateral trajectory control system and method for a vehicle includes performing trajectory tracking control (TTC) of the vehicle by executing an outer linear quadratic regulator (LQR) control loop to determine both feedback and feedforward control terms and, based thereon, calculate a desired steering angle for the vehicle, executing a sliding mode control (SMC) inner control loop with a dynamic reaching phase gain to determine a desired steering torque to achieve the desired steering angle calculated by the outer LQR control loop, and controlling an electric power steering (EPS) system of the vehicle based on the desired steering torque for improved lateral trajectory control of the vehicle during the TTC, wherein the EPS system is configured to control a steering angle of a pair of wheels of the vehicle and the EPS comprises an electric motor and a systems of gears and linkage.

20 Claims, 4 Drawing Sheets

(52) U.S. Cl.
CPC . *B60W 2710/202* (2013.01); *B60W 2710/207* (2013.01)

(56) References Cited

U.S. PATENT DOCUMENTS

| | | | | |
|---|---|---|---|---|
| 2022/0289292 | A1* | 9/2022 | Shahriari | B62D 5/0463 |
| 2023/0278622 | A1* | 9/2023 | Shahriari | B62D 5/0463 701/42 |
| 2023/0356771 | A1* | 11/2023 | Khasawneh | B62D 5/0472 |
| 2023/0356774 | A1* | 11/2023 | Zhang | B62D 15/025 |
| 2025/0276678 | A1* | 9/2025 | Ahangarnejad | B60W 10/20 |

OTHER PUBLICATIONS

Perez, Joshue et al., "Cascade Architecture for Lateral Control in Autonomous Vehicles", IEEE Transactions on Intelligent Transportation System, vol. 12, No. 1, p. 73-82. Mar. 2011.
Xu, Tao, et al., "Cascaded Steering Control Paradigm for the Lateral Automation of Heavy Commercial Vehicles", IEEE Transactions on Transportation Electrification, vol. 8, No. 2, p. 2346-2360. Jun. 2022.

* cited by examiner

CASCADED OPTIMAL ROBUST CONTROLLER FOR TRAJECTORY FOLLOWING IN AUTONOMOUS VEHICLES

FIELD

The present application generally relates to vehicle autonomy and, more particularly, to systems and methods for a cascaded optimal robust controller for trajectory following in autonomous vehicles.

BACKGROUND

Today's vehicles can include various autonomous or advanced driver-assistance system (ADAS) features. One key autonomous feature is trajectory tracking control (TTC), which involves both the longitudinal control (i.e., speed) and lateral control (i.e., steering) of the vehicle within a lane. Lateral control involves the control of an electric power steering (EPS) system to adjust the lateral heading of the vehicle. One of the most challenging problems in lateral trajectory following is curve entry and curve exit handling. Existing vehicle lateral trajectory control systems, however, have limited feedback gains. Most conventional systems utilize only a single (outer) loop for controlling steering torque to a desired or target angle. None of these conventional systems account for static friction and backlash between the gears of the electric power steering (EPS) system, which can cause delay in the lateral control. Accordingly, while such conventional vehicle lateral trajectory control systems and methods do work for their intended purpose, there exists an opportunity for improvement in the relevant art.

SUMMARY

According to one example aspect of the invention, a cascaded two-level lateral trajectory control system for a vehicle is presented. In one exemplary implementation, the cascaded two-level lateral trajectory control system comprises an electric power steering (EPS) system configured to control a steering angle of a pair of wheels of the vehicle, the EPS comprising an electric motor and a systems of gears and linkage, a plurality of sensors configured to measure a plurality of parameters including at least one vehicle operating parameter and at least one environmental parameter of a road lane in which the vehicle is traveling, and a control system configured to perform trajectory tracking control (TTC) of the vehicle based on the plurality of parameters, including executing an outer linear quadratic regulator (LQR) control loop to determine both feedback and feedforward control terms and, based thereon, calculate a desired steering angle for the vehicle and executing an inner sliding mode control (SMC) control loop with a dynamic reaching phase gain to determine a desired steering torque to achieve the desired steering angle calculated by the outer LQR control loop, wherein the control system is further configured to control the EPS based on the desired steering torque for improved lateral trajectory control of the vehicle during the TTC.

In some implementations, the control system is further configured to determine a desired lateral position of the vehicle and a desired heading of the vehicle, and wherein the plurality of parameters include an actual lateral position of the vehicle, an actual heading of the vehicle, a curvature of the road lane. In some implementations, the control system is further configured to calculate a plurality of errors including (i) a lateral position error between the desired and actual lateral positions of the vehicle, (ii) a heading error between the desired and actual headings of the vehicle, and (iii) a yaw rate error between desired and actual yaw rates of the vehicle.

In some implementations, the outer LQR control loop is configured to utilize a dynamical vehicle model that is based on two degrees-of-freedom including the yaw rate of the vehicle and a side slip of the vehicle, and wherein the control system is further configured to determine weighting matrices for the dynamical vehicle model based on the plurality of errors. In some implementations, the control system is further configured to (i) calculate first gains for the outer LQR control loop by minimizing a cost function that includes the weighting matrices for the dynamical vehicle model and (ii) determine the feedback control terms by applying the first gains to the plurality of errors. In some implementations, the control system is further configured to calculate the feedforward control term based on the dynamical vehicle model at steady-state conditions, the curvature of the road lane, and a speed of the vehicle from the plurality of parameters.

In some implementations, the control system is further configured to calculate the desired steering angle based on a sum of the feedback term and the feedforward term. In some implementations, the inner SMC control loop with the dynamic reaching phase gain includes (i) calculating an error between a desired steering angle of the vehicle and an actual steering angle of the vehicle from the plurality of parameters and (ii) calculating a sliding surface value based on the error and a sliding phase gain. In some implementations, the control system is further configured to calculate the desired steering torque using a steering model and based on the sliding surface value and reaching phase gains. In some implementations, the TTC is an autonomous or advanced driver-assistance system (ADAS) feature of the vehicle.

According to another example aspect of the invention, a cascaded two-level lateral trajectory control method for a vehicle is presented. In one exemplary implementation, the cascaded two-level lateral trajectory control method comprises receiving, by a control system of the vehicle and from a plurality of sensors of the vehicle, a plurality of parameters including at least one vehicle operating parameter and at least one environmental parameter of a road lane in which the vehicle is traveling, performing, by the control system, TTC of the vehicle based on the plurality of parameters, including executing an outer LQR control loop to determine both feedback and feedforward control terms and, based thereon, calculate a desired steering angle for the vehicle, executing an inner SMC control loop with a dynamic reaching phase gain to determine a desired steering torque to achieve the desired steering angle calculated by the outer LQR control loop, and controlling an EPS system of the vehicle based on the desired steering torque for improved lateral trajectory control of the vehicle during the TTC, wherein the EPS system is configured to control a steering angle of a pair of wheels of the vehicle, the EPS comprising an electric motor and a systems of gears and linkage.

In some implementations, the cascaded two-level lateral trajectory control method further comprises determining, by the control system, a desired lateral position of the vehicle and a desired heading of the vehicle, and wherein the plurality of parameters include an actual lateral position of the vehicle, an actual heading of the vehicle, a curvature of the road lane. In some implementations, the cascaded two-level lateral trajectory control method further comprises calculating, by the control system, a plurality of errors including (i) a lateral position error between the desired and actual lateral positions of the vehicle, (ii) a heading error between the desired and actual headings of the vehicle, and (iii) a yaw rate error between desired and actual yaw rates of the vehicle.

In some implementations, the outer LQR control loop is configured to utilize a dynamical vehicle model that is based on two degrees-of-freedom including the yaw rate of the vehicle and a side slip of the vehicle, and wherein the cascaded two-level lateral trajectory control method further comprises determining, by the control system, weighting matrices for the dynamical vehicle model based on the plurality of errors. In some implementations, the cascaded two-level lateral trajectory control method further comprises (i) calculating, by the control system, first gains for the outer LQR control loop by minimizing a cost function that includes the weighting matrices for the dynamical vehicle model and (ii) determining, by the control system, the feedback control terms by applying the first gains to the plurality of errors. In some implementations, the cascaded two-level lateral trajectory control method of further comprises calculating, by the control system, the feedforward control term based on the dynamical vehicle model at steady-state conditions, the curvature of the road lane, and a speed of the vehicle from the plurality of parameters.

In some implementations, the cascaded two-level lateral trajectory control method further comprises calculating, by the control system, the desired steering angle based on a sum of the feedback term and the feedforward term. In some implementations, the inner SMC control loop with the dynamic reaching phase gain includes (i) calculating an error between a desired steering angle of the vehicle and an actual steering angle of the vehicle from the plurality of parameters and (ii) calculating a sliding surface value based on the error and a sliding phase gain. In some implementations, the cascaded two-level lateral trajectory control method of further comprises calculating, by the control system, the desired steering torque using a steering model and based on the sliding surface value and reaching phase gains. In some implementations, the TTC is an autonomous or ADAS feature of the vehicle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
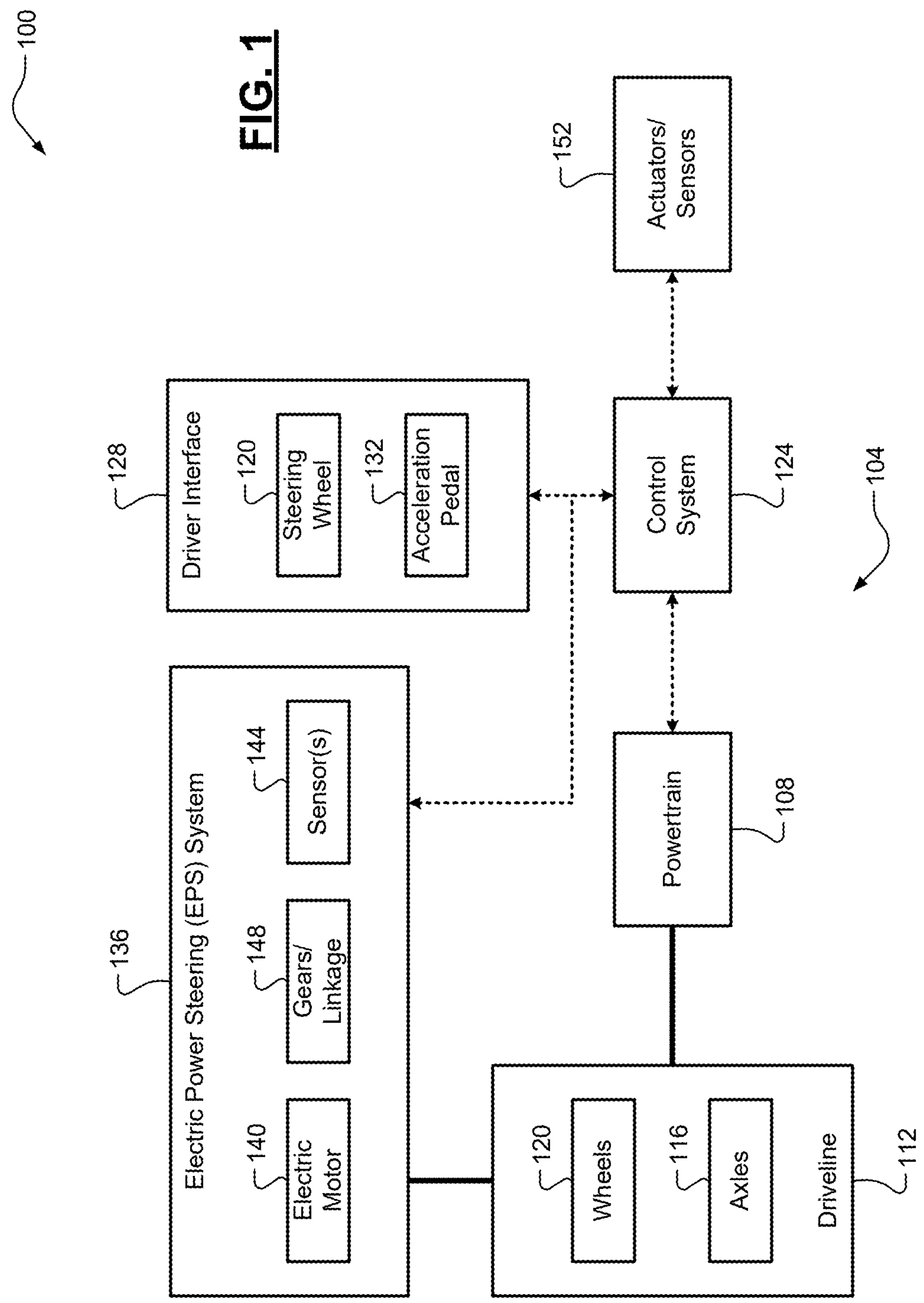
FIG. 1 is a functional block diagram of a vehicle having an example cascaded two-level lateral trajectory control system according to the principles of the present application.

As previously discussed, today's vehicles can include a variety of different autonomous or advanced driver-assistance system (ADAS) features. One key autonomous feature is trajectory tracking control (TTC), which involves both the longitudinal control (i.e., speed) and lateral control (i.e., steering) of the vehicle within a lane. The lateral control involves the control of an electric power steering (EPS) system to adjust the lateral heading of the vehicle within the lane. One of the most challenging problems in lateral trajectory following is curve entry and curve exit handling (i.e., the beginning and end of a significant curvature in the line). Existing vehicle lateral trajectory control systems, however, have limited feedback gains for error-based control. Most conventional systems utilize only a single (outer) loop for controlling steering torque to a desired or target angle. In some cases, a system supplier limits the feedback gain value for this single control loop. In addition, none of these conventional systems account for static friction and backlash between the gears of the electric power steering (EPS) system, which can cause delay in the lateral control.

While most conventional systems utilize a single (outer) loop for controlling steering torque, a few solutions do exist that discuss two control loops. A first possible solution utilizes fuzzy logic in an outer loop and proportional-integral-derivative (PID) control in an inner loop. A second possible solution uses backstepping control in both the inner and outer loops. A third possible solution uses an outer loop with a model that controls vehicle distance/heading in a totally different manner, while the inner loop controls side slip angle and yaw rate of the vehicle using model predictive control. A fourth possible solution uses linear parameter varying (LOP) in the outer loop and a PID controller with a sliding mode observer (SMO) in the inner loop, with the SMO being for state estimation and the PID controller being for steering angle control. Lastly, a fifth possible solution uses neural networks in a single (outer) loop.

The above-described possible solutions all have various drawbacks. Fuzzy logic, for example, is not a systematic approach, is computationally expensive, and lacks accuracy due to its reliance on human-generated rules. More specifically, if the designer missed creating a rule for a specific scenario, an unpredicted vehicle behavior could result, which can cause instability. PID control is also known for its lack of robustness and disturbances and its integral windup can cause instability if it is not handled properly. A neural network based control approach is also computationally expensive and lacks robustness because its convergence is not global, i.e., it depends on the sufficiency of the training data. More specifically, if the training data does not cover a specific scenario, the controller behavior will degrade and could become unstable. This approach is also time consuming as it involves extensive driving to collect the training data, followed by an offline training phase before even designing, tuning, and testing the final neural network model.

In addition to the above-described drawbacks of the various possible solutions discussed herein, the control gains in all of these conventional solutions are constant, i.e., none of them are dynamic. This means that the same control gains are used in both steady-state and transitioning maneuvers, and the gain cannot adjust itself based on the size of the error, which can become large during transitioning maneuvers and can also be small during steady-state. This can result in some predetermined gains working better in one case compared to other cases because the controller cannot tune itself to account for the size of the error. Further, none of the above-described conventional solutions discusses or suggests a feedforward approach to solve steady-state error caused by road curvature, i.e., they are only focused on feedback control, nor do any of the solutions solve the dead zone problem caused by static friction and backlash in the EPS system.

Accordingly, improved systems and methods that utilize a cascaded two-level control structure that work together for improved vehicle lateral trajectory control following. A first higher-level outer loop controller (e.g., a chassis dynamic controller) utilizes a linear quadratic regulator (LQR), which is ideal for handling systems with actuator limitations, i.e., balancing multiple sources of error. EPS systems, for example, could be limited to a maximum amount of power steering torque (e.g., 1.5 Newton-meters, or Nm). The lower-level inner loop controller (e.g., steering controller) utilizes sliding mode control (SMC) with a dynamic reaching phase gain, which automatically adjusts the gain proportionally to the size of the error to minimize oscillation or "chattering" caused by constant sliding mode reaching phase gain and dead zone caused by the static friction or "stiction" and backlash in the EPS system. From a customer's point-of-view, potential benefits of these improved techniques can include (i) mitigated or eliminated delay at curve entry, (ii) mitigated or eliminated overshoot at curve exit, and/or (iii) mitigated or eliminated oscillations during curve entry/exit.

Referring now to FIG. 1, a functional block diagram of a vehicle 100 having an example lateral trajectory control system 104 according to the principles of the present application is illustrated. The vehicle 100 generally comprises a powertrain 108 configured to generate and transfer drive torque to a driveline 112 for vehicle propulsion. Non-limiting examples of components of the powertrain 108 include an internal combustion engine, an electric motor and a high voltage battery pack or system, a transmission or gear reducer, and combinations thereof. As shown, the driveline 112 include one or more differentials (not shown), at least two axles or pairs of half-shafts 116, and at least four wheels/hubs 120. It will be appreciated that the driveline 112 could further include other non-illustrated components, such as one or more differentials and/or a transfer case. A control system 124, which can include one or more electronic control units (ECUs) connected via a controller area network (CAN) or similar communication network, is configured to control operation of the powertrain 108. The control of the powertrain 108 by the control system 124 primarily comprises controlling the powertrain 108 to generate a sufficient amount of drive torque to satisfy a driver torque request. The driver torque request can be provided by a driver of the vehicle 100 via a driver interface 128, such as via an accelerator pedal 132.

The vehicle further comprises an EPS system 136 associated with the driveline 112. In the illustrated embodiment, the EPS system 136 comprises an electric motor 140, a set of one or more sensors 144 (a torque sensor, a steering angle sensor, etc.), and a system of gears and linkages 148 (e.g., a rack-and-pinion system). The EPS system 136 receives driver steering input via a steering wheel 152 of a driver interface 128, and the steering wheel 144 could have a separate steering angle sensor (not shown). While sensors 144 are specifically shown, it will be appreciated that the vehicle 100 can further comprise other actuators/sensors 152, such as, but not limited to, actuators for engine/motor control and sensors for measuring/monitoring positions/speeds/accelerations, temperatures, pressures, electrical parameters (voltage, current, etc.), perception (RADAR, LIDAR, camera(s), etc.), and inertial measurements (pitch, yaw, etc.). The control system 132 is also configured to control at least some aspects of the lateral trajectory control techniques of the present application, which will now be discussed in greater detail. As previously mentioned, the execution of these techniques could also be performed by a specific sub-ECU, such as an EPS ECU or a specific autonomous/ADAS ECU.

Figure 2A:
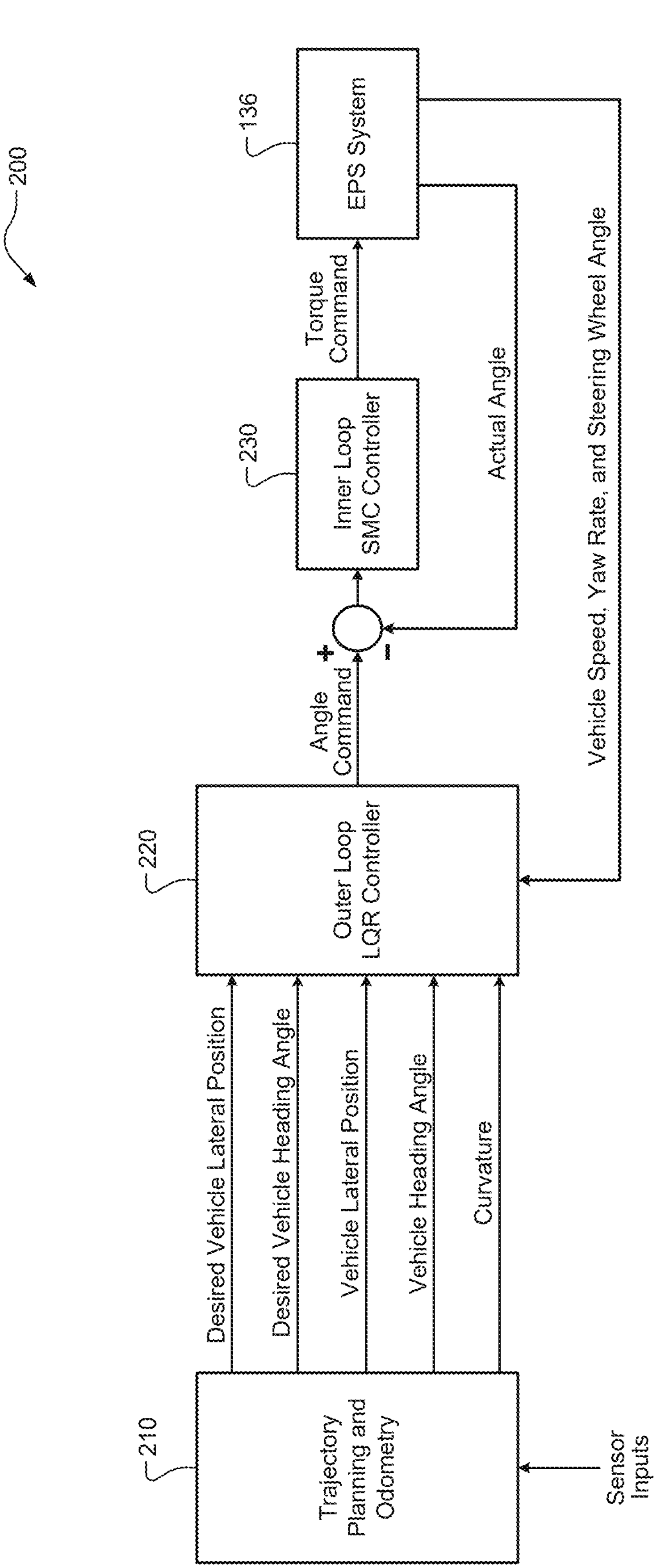
FIG. 2A is a functional block diagram of an example system architecture for the cascaded two-level lateral trajectory control system according to the principles of the present application.

Referring now to FIG. 2A and with continued reference to FIG. 1, a functional block diagram of an example system architecture 200 for the lateral trajectory control system 104 according to the principles of the present application is illustrated. Initially, a trajectory planning and odometry module 210 (which also could be two separate modules—one for odometry and one for trajectory planning) determines, e.g., based on information from the various sensors 144 and 152 (EPS sensors, perception sensors such as RADAR, LIDAR, and/or cameras, etc.), the following parameters: (1) desired vehicle lateral position, (2) desired vehicle heading angle, (3) actual/currentvehicle lateral position, (4) actual vehicle heading angle, and (5) road/lane curvature. An outer loop LQR controller 220 receives these five parameters, i.e., the lateral deviation and the heading angle deviation of the vehicle from the intended trajectory, in addition to the road curvature, to compute the steering angle required to correct the deviations of the vehicle from the desired trajectory and follow the curvature of the road. An inner loop SMC controller 230 receives the steering angle request from the outer loop LQR controller 220 and convert it to steering torque to actuate the EPS system 136, which moves the driveline 112 (i.e., the wheels 120) to achieve the steering angle requested by the outer loop LQR controller 220. The combination of LQR (optimal control) and SMC (robust control) for vehicle trajectory following and the choice of where to use the LQR (outer loop) and SMC (inner loop), results in excellent performance and proves experimentally the capability to solve many problems that control designers encounter in vehicle lateral control.

LQR with dynamic feedforward is chosen for the outer loop control method because of the limited steering authority that is available from a supplier of the EPS system 136 supplier for safety reasons. Usually, for normal highway driving, the EPS maximum allowable torque does not exceed a certain maximum value (e.g., ~1.5 Nm). If a torque command larger than this value is generated and provided, the torque will saturate. In other words, LQR is chosen as the outer loop control method because of its ability to handle actuator limitations. Because multiple variables are being controlled in the outer loop LQR controller 220, the control gains for those variables should be chosen carefully so that the resulting angle command does not result in a large torque command that causes actuator saturation. Large gains on those variables will help achieving fast system response, but at the same time will require larger control effort that the actuator might not be able to provide. The outer loop LQR controller 220 computes the control gains in an optimal way that balances between achieving the fastest response achievable without saturating the actuator by minimizing a cost function. In addition, a dynamic feedforward control is provided to mitigate or eliminate the steady-state error caused by the curvature of the road. Without this feedforward control, no matter what the control method is, the trajectory could not be followed without a large error.

The performance of the outer loop LQR controller 220 also depends highly on the performance of the inner loop SMC controller 230. These two controllers 220, 230 work together (cascaded, or "hand-in-hand") to provide lateral guidance for the vehicle 100. If the inner loop SMC controller 230 cannot deliver the desired steering angle that the outer loop LQR controller 220 is requesting, the vehicle 100 will fail tracking the desired trajectory, which might result in departing the lane or, in the worst case, could cause lateral instability. Because the EPS system 136 (i.e., the gears/linkage 148) has discontinuous nonlinearities that cannot be linearized, such as backlash and stiction, linear control methods cannot control it properly. Controlling it therefore requires a non-linear and robust control method to be able to compensate for those non-linearities properly. For these reasons, SMC with a dynamic reaching phase gain is chosen to control the steering angle because of its ability to achieve the desired control response in the presence of disturbances and uncertainties. Disturbance can be internal, such as the mentioned backlash and stiction, or external, such as cross wind and road bank.

Figure 2B:
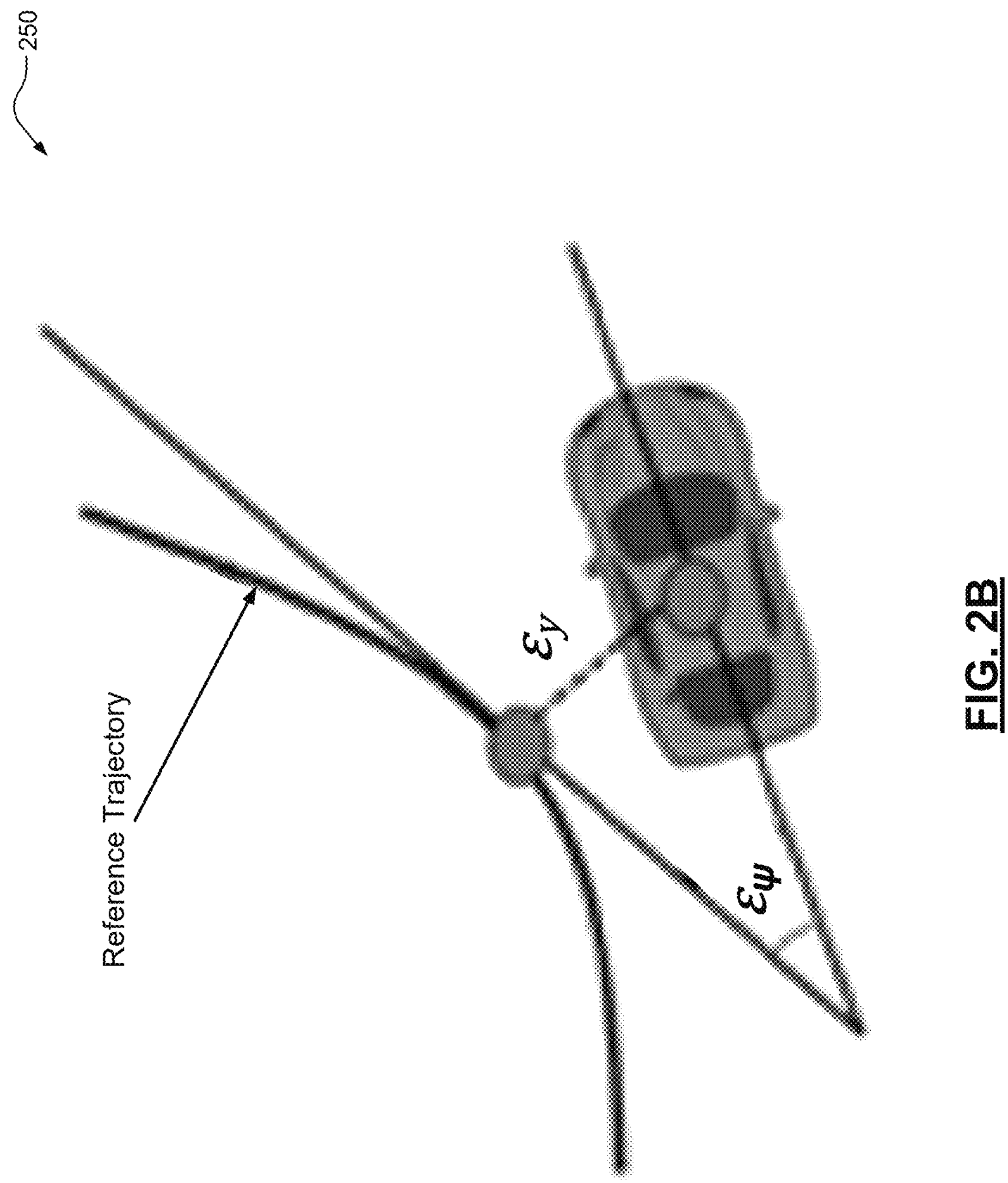
FIG. 2B is an illustration of an example curvature scenario of a vehicle and depicting error values relative to a reference trajectory according to the principles of the present application.
Figure 3:
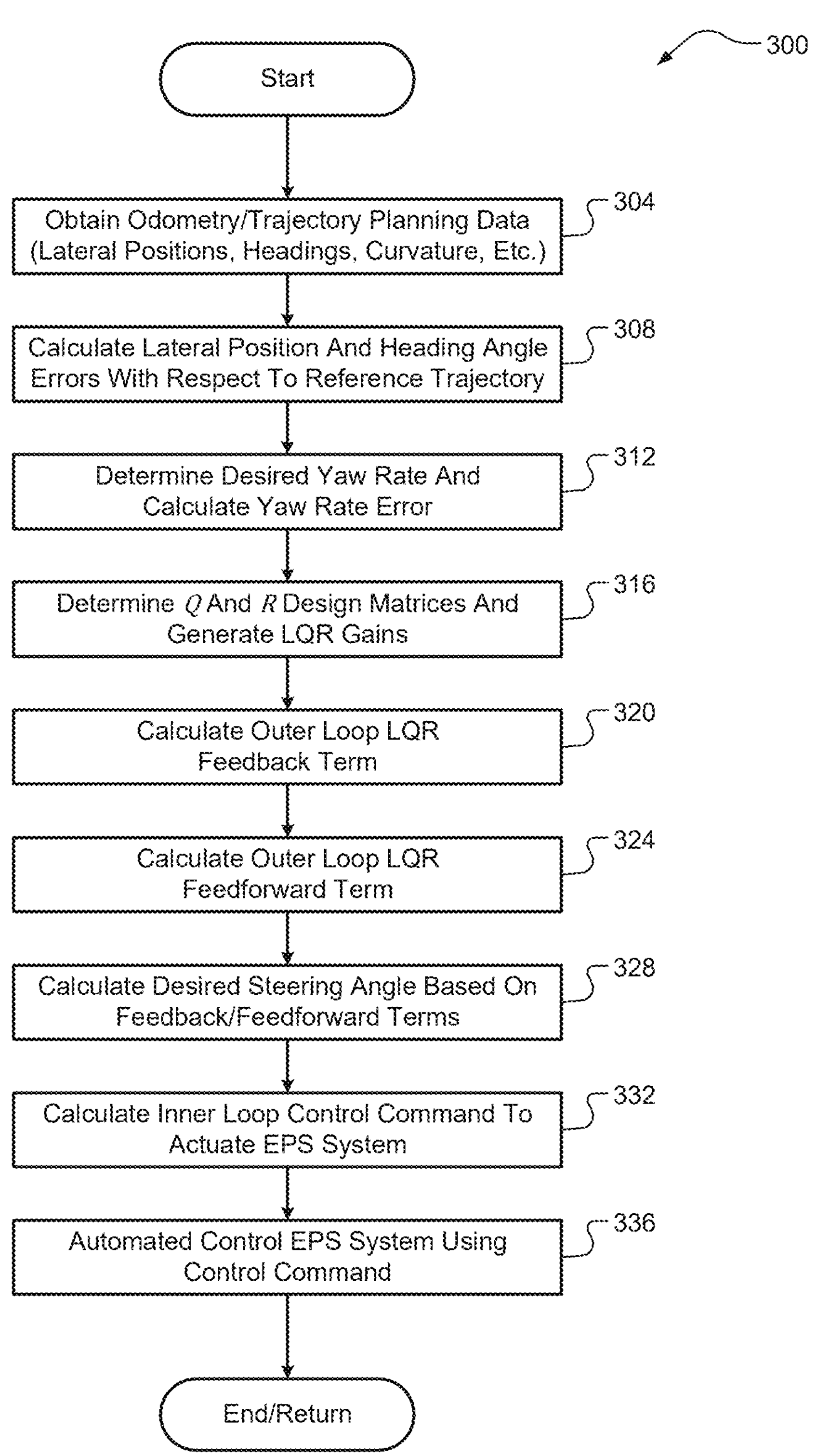
FIG. 3 is a flow diagram of an example cascaded two-level lateral trajectory control method for a vehicle according to the principles of the present application.

Referring now to FIG. 3 and with continued reference to FIGS. 1-2B, a flow diagram of an example cascaded two-level lateral trajectory control method 300 for a vehicle according to the principles of the present application is illustrated. While the method 300 specifically references the vehicle 100 and its components for descriptive/illustrative purposes, it will be appreciated that the method 300 could be applicable to any suitably-configured vehicle. The method 300 begins at 304 where the control system 132 obtains odometry and trajectory planning data, e.g., based on parameters from the perception sensors 152 and/or other vehicle sensors/systems. At 308, the control system 132 calculates the lateral position error ($\varepsilon_y$) and heading angle error ($\varepsilon_\psi$) with respect to a reference trajectory as shown in FIG. 2B and as follows:

$$\varepsilon_y = y_{des} - y_{veh}, \tag{1}$$

and $$\varepsilon_\psi = \psi_{des} - \psi_{veh}, \tag{2}$$

where the lateral position error $\varepsilon_y$ represents the deviation of vehicle lateral position ($y_{veh}$) from reference trajectory vehicle position ($y_{des}$) and the heading angle error $\varepsilon_\psi$ represents the deviation of the vehicle heading ($\psi_{veh}$) from the reference trajectory vehicle heading ($\psi_{des}$). At 312, the control system 132 determines a desired yaw rate ($\dot{\psi}_{des}$), where the yaw rate ($\dot{\psi}$) is the rate of change of the yaw angle ($\psi$), which is the same as the heading angle, which can be calculated as:

$$\dot{\psi}_{des} = v * \kappa, \tag{3}$$

where v represents the vehicle speed and $\kappa$ represents the road curvature. The control system 132 then calculates a yaw rate error ($\varepsilon_{\dot{\varphi}}$) as:

$$\varepsilon_{\dot{\psi}} = \dot{\psi}_{des} - \dot{\psi}_{meas}, \tag{4}$$

where $\dot{\psi}_{des}$ represents a measured yaw rate.

At 316, the control system 132 determines Q and R design weighting matrices for the outer loop LQR controller 220 and generates LQR gains. In one example embodiment, a two degrees-of-freedom dynamical vehicle model can be used to develop the TTC. For example, the two degrees-of-freedom can be represented by the vehicle side slip angle and the vehicle yaw angle as follows:

$$\begin{bmatrix} \dot{\beta} \\ \ddot{\psi} \end{bmatrix} = \begin{bmatrix} \frac{a_{11}}{v} & \frac{a_{12}}{v^2} - 1 \\ a_{21} & \frac{a_{22}}{v} \end{bmatrix} \begin{bmatrix} \beta \\ \dot{\psi} \end{bmatrix} + \begin{bmatrix} \frac{b_1}{v} \\ b_2 \end{bmatrix} \delta, \tag{5}$$

where:

$$a_{11} = -\frac{(C_r + C_f)}{m}, , \tag{6}$$

$$a_{12} = \frac{C_r l_r - C_f l_f}{m}, \tag{7}$$

$$a_{22} = -\frac{C_r l_r^2 + C_f l_f^2}{I_z}, \tag{8}$$

$$a_{22} = -\frac{C_r l_r^2 + C_f l_f^2}{I_z}, \tag{9}$$

and $$b_1 = \frac{C_f}{m}, b_2 = \frac{C_f l_f}{I_z}. \tag{10}$$

In the above, $\beta$ represents a vehicle body side slip angle, $\psi$ represents the vehicle heading angle, $\delta$ represents a front wheel steering angle, v represents the vehicle longitudinal speed, $l_f$ represents a distance from a center-of-gravity (CG) of the vehicle 100 to a front axle 116, $l_r$ represents a distance from the CG of the vehicle 100 to a rear axle 116, m represents a mass of the vehicle 100, $I_z$ represents a moment of inertia of the vehicle 100, and $C_f$ and $C_r$ represent cornering stiffness at front and rear wheels 120, respectively, of the vehicle 100.

The above-described model can be modified by (1) removing the side slip angle because for normal highway driving it is sufficient to stabilize the vehicle using yaw rate and (2) adding the error dynamics with respect to the reference trajectory to the model to make it suitable for trajectory tracking control. The final resulting model can be as shown below:

$$\begin{bmatrix} \dot{\varepsilon}_y \\ \dot{\varepsilon}_\psi \\ \ddot{\psi} \end{bmatrix} = \underbrace{\begin{bmatrix} 0 & v & 0 \\ 0 & 0 & -1 \\ 0 & 0 & \frac{a_{22}}{v} \end{bmatrix}}_{A} \underbrace{\begin{bmatrix} \varepsilon_y \\ \varepsilon_\psi \\ \dot{\psi} \end{bmatrix}}_{x} + \underbrace{\begin{bmatrix} 0 \\ 0 \\ b_2 \end{bmatrix}}_{B} \underbrace{\delta}_{u} + \begin{bmatrix} 0 \\ v\kappa \\ 0 \end{bmatrix}. \tag{11}$$

The optimal control gains for the outer loop LQR controller 220 can then be calculated by minimizing a cost function as follows:

$$J = \int_0^\infty (x^T Q x + u^T R u) dt, \tag{12}$$

where:

$$x = \begin{bmatrix} \varepsilon_y \\ \varepsilon_\psi \\ \dot{\psi} \end{bmatrix} \tag{13}$$

represents the state vector, and u(u=δ) represents the steering angle command, and Q and R represent the design weighting matrices (which can be designed or selected by a designer, developer, engineer, etc.). After obtaining Q and R, to solve for the optimal control gains, a positive definite matrix P (below) from the algebraic Riccati equation must first be solved:

$$PA + A^T P - PBR^{-1}B^T P + Q = 0. \tag{14}$$

After obtaining P, the optimal controller gains $K=[k_1\ k_2\ k_3]$ can be found as:

$$K = R^{-1} B^T P. \tag{15}$$

At 320, the calculates the outer loop LQR feedback control law or feedback term ($\delta_{feedback}$), which consists of the errors computed in steps 308 and 312 multiplied by the optimal feedback gains generated in step 316:

$$\delta_{feedback} = -k_1 * \varepsilon_y - k_2 * \varepsilon_\psi - k_3 * \varepsilon_{\dot{\psi}}. \tag{16}$$

At 324, the control system 132 calculates the outer loop LQR feedforward control law or term. The feedforward term is calculated based on the road curvature κ and vehicle speed v to compute the steering angle required to negotiate this curvature. For example, this calculation can be from vehicle steady-state dynamics from the model (Equation 5), where the steady-state steering angle is given by:

$$\delta_{ss} = \left( \frac{\frac{a_{12} - v^2}{a_{11}} - a_{22}}{b_2 - \frac{a_{21} b_1}{a_{11}}} \right) \kappa, \tag{17}$$

where $\delta_{feedforward}=\delta_{ss}$. At 328, the control system 132 calculates a desired steering angle ($\delta_{desired}$) based on the calculated LQR feedback and feedforward terms $\delta_{feedforward}$ and $\delta_{feedforward}$, respectively. For example, these two terms could be summed together ($\delta_{desired}=\delta_{feedback}+\delta_{feedforward}$). It will be appreciated that other weighting or gains could also be applied in the calculation of this desired steering angle $\delta_{desired}$.

At 332, the control system 132 calculates a control law for the inner loop SMC controller 230. This inner loop SMC control law is utilized to calculate a desired steering torque ($\tau_p$) to deliver the desired steering angle $\delta_{desired}$ requested by the outer loop LQR controller 220 using SMC with dynamic reaching phase gain. The inner loop SMC control law can based on a steering model as follows:

$$\tau_p = b\dot{\delta}_{meas} + F\,\mathrm{sgn}(\dot{\delta}_{meas}) + \tau_a + J\ddot{\delta}_{desired} - J\lambda\dot{e} - (k_1 + k_2 s^2)\mathrm{sgn}(s) \tag{18}$$

where e represents the error between the measured steering angle $\delta_{meas}$ and the desired steering angle $\delta_{desired}$ provided by the outer loop LQR controller 220, s represents a sliding surface (e.g., $s=\dot{e}+\lambda e$) is the sliding surface, λ represents a positive design control parameter, also known as a sliding phase gain, $k_1$ and $k_2$ represent positive design control parameters, also known as reaching phase gains. The overall dynamic reaching phase gain can be calculated as $(k_1+k_2s^2)$.

It can be observed that it is a dynamic gain because it is changing with value of s. This makes the reaching phase gain adaptive to the scenario. The variable s is a function of both error and error derivative. When the steering direction is changed at transitioning maneuvers, such as lane change or curve entry, the error is large, which follows that s is also large, and the overall reaching phase gain $(k_1+k_2s^2)$ becomes large, which enables the control techniques to overcome stiction and backlash (which can be encountered at transitioning maneuvers). At steady-state scenarios, such as driving on a straight road, the error is very small, and thus squaring a small number results in an even a smaller number, so the overall gain $(k_1+k_2s^2)$ will converge to $k_1$, which will avoid steady-state oscillations. Finally, at 336, the control system 132 controls the EPS system 136 (e.g., the electric motor 140) based on the desired steering torque command $\tau_p$ generated at 332. The method 300 then ends or returns to 304 for one or more additional cycles (e.g., until the TTC feature of the vehicle 100 is disabled).

To briefly summarize, the proposed combination of an optimal control technique for the outer loop and an optimal control technique for the inner loop proves experimentally to solve the most challenging problems in lateral vehicle control. More specifically, an optimal control method (LQR) with a dynamic feedforward can be used to compute the outer loop controller (TTC) gains optimally to avoid saturating the actuator (EPS) and to mitigate or eliminate the steady-state error because of the dynamic feedforward. Then, a robust controller (SMC) with dynamic reaching phase gain can be used to control the steering angle while rejecting the disturbances. Because of the stiction and the backlash that a vehicle encounters when steering direction reverses (e.g., during a lane change and/or entering a curve), a dead zone is encountered that causes delay in the steering response. In this case, a large reaching SMC gain is needed to overcome this situation, but if that same gain were to be used during steady-state driving, such as straight lane driving, it would likely be too large and could potentially cause oscillations. For this reason, the reaching phase gain is proposed to be dynamic and adjust itself based on the scenario. The proposed techniques have various benefits compared to the conventional solutions previously discussed in detail herein, including being not computationally expensive and not time consuming to design, calibrate and test.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A cascaded two-level lateral trajectory control system for a vehicle, the cascaded two-level lateral trajectory control system comprising:

- an electric power steering (EPS) system configured to control a steering angle of a pair of wheels of the vehicle, the EPS comprising an electric motor and a systems of gears and linkage;
- a plurality of sensors configured to measure a plurality of parameters including at least one vehicle operating parameter and at least one environmental parameter of a road lane in which the vehicle is traveling; and
- a control system configured to perform trajectory tracking control (TTC) of the vehicle based on the plurality of parameters, including:
  - executing an outer linear quadratic regulator (LQR) control loop to determine both feedback and feedforward control terms and, based thereon, calculate a desired steering angle for the vehicle; and
  - executing an inner sliding mode control (SMC) control loop with a dynamic reaching phase gain to determine a desired steering torque to achieve the desired steering angle calculated by the outer LQR control loop,
- wherein the control system is further configured to control the EPS based on the desired steering torque for improved lateral trajectory control of the vehicle during the TTC.

2. The cascaded two-level lateral trajectory control system of claim 1, wherein the control system is further configured to determine a desired lateral position of the vehicle and a desired heading of the vehicle, and wherein the plurality of parameters include an actual lateral position of the vehicle, an actual heading of the vehicle, a curvature of the road lane.

3. The cascaded two-level lateral trajectory control system of claim 2, wherein the control system is further configured to calculate a plurality of errors including (i) a lateral position error between the desired and actual lateral positions of the vehicle, (ii) a heading error between the desired and actual headings of the vehicle, and (iii) a yaw rate error between desired and actual yaw rates of the vehicle.

4. The cascaded two-level lateral trajectory control system of claim 3, wherein the outer LQR control loop is configured to utilize a dynamical vehicle model that is based on two degrees-of-freedom including the yaw rate of the vehicle and a side slip of the vehicle, and wherein the control system is further configured to determine weighting matrices for the dynamical vehicle model based on the plurality of errors.

5. The cascaded two-level lateral trajectory control system of claim 4, wherein the control system is further configured to (i) calculate first gains for the outer LQR control loop by minimizing a cost function that includes the weighting matrices for the dynamical vehicle model and (ii) determine the feedback control terms by applying the first gains to the plurality of errors.

6. The cascaded two-level lateral trajectory control system of claim 5, wherein the control system is further configured to calculate the feedforward control term based on the dynamical vehicle model at steady-state conditions, the curvature of the road lane, and a speed of the vehicle from the plurality of parameters.

7. The cascaded two-level lateral trajectory control system of claim 6, wherein the control system is further configured to calculate the desired steering angle based on a sum of the feedback term and the feedforward term.

8. The cascaded two-level lateral trajectory control system of claim 7, wherein the inner SMC control loop with the dynamic reaching phase gain includes (i) calculating an error between a desired steering angle of the vehicle and an actual steering angle of the vehicle from the plurality of parameters and (ii) calculating a sliding surface value based on the error and a sliding phase gain.

9. The cascaded two-level lateral trajectory control system of claim 8, wherein the control system is further configured to calculate the desired steering torque using a steering model and based on the sliding surface value and reaching phase gains.

10. The cascaded two-level lateral trajectory control system of claim 1, wherein the TTC is an autonomous or advanced driver-assistance system (ADAS) feature of the vehicle.

11. A cascaded two-level lateral trajectory control method for a vehicle, the cascaded two-level lateral trajectory control method comprising:

- receiving, by a control system of the vehicle and from a plurality of sensors of the vehicle, a plurality of parameters including at least one vehicle operating parameter and at least one environmental parameter of a road lane in which the vehicle is traveling;
- performing, by the control system, trajectory tracking control (TTC) of the vehicle based on the plurality of parameters, including:
  - executing an outer linear quadratic regulator (LQR) control loop to determine both feedback and feedforward control terms and, based thereon, calculate a desired steering angle for the vehicle;
  - executing an inner sliding mode control (SMC) control loop with a dynamic reaching phase gain to determine a desired steering torque to achieve the desired steering angle calculated by the outer LQR control loop; and
  - controlling an electric power steering (EPS) system of the vehicle based on the desired steering torque for improved lateral trajectory control of the vehicle during the TTC, wherein the EPS system is configured to control a steering angle of a pair of wheels of the vehicle, the EPS comprising an electric motor and a systems of gears and linkage.

12. The cascaded two-level lateral trajectory control method of claim 11, further comprising determining, by the control system, a desired lateral position of the vehicle and a desired heading of the vehicle, and wherein the plurality of parameters include an actual lateral position of the vehicle, an actual heading of the vehicle, a curvature of the road lane.

13. The cascaded two-level lateral trajectory control method of claim 12, further comprising calculating, by the control system, a plurality of errors including (i) a lateral position error between the desired and actual lateral positions of the vehicle, (ii) a heading error between the desired and actual headings of the vehicle, and (iii) a yaw rate error between desired and actual yaw rates of the vehicle.

14. The cascaded two-level lateral trajectory control method of claim 13, wherein the outer LQR control loop is configured to utilize a dynamical vehicle model that is based on two degrees-of-freedom including the yaw rate of the vehicle and a side slip of the vehicle, and wherein the cascaded two-level lateral trajectory control method further comprises determining, by the control system, weighting matrices for the dynamical vehicle model based on the plurality of errors.

15. The cascaded two-level lateral trajectory control method of claim 14, further comprising (i) calculating, by the control system, first gains for the outer LQR control loop by minimizing a cost function that includes the weighting matrices for the dynamical vehicle model and (ii) determining, by the control system, the feedback control terms by applying the first gains to the plurality of errors.

16. The cascaded two-level lateral trajectory control method of claim 15, further comprising calculating, by the control system, the feedforward control term based on the dynamical vehicle model at steady-state conditions, the curvature of the road lane, and a speed of the vehicle from the plurality of parameters.

17. The cascaded two-level lateral trajectory control method of claim 16, further comprising calculating, by the control system, the desired steering angle based on a sum of the feedback term and the feedforward term.

18. The cascaded two-level lateral trajectory control method of claim 17, wherein the inner SMC control loop with the dynamic reaching phase gain includes (i) calculating an error between a desired steering angle of the vehicle and an actual steering angle of the vehicle from the plurality of parameters and (ii) calculating a sliding surface value based on the error and a sliding phase gain.

19. The cascaded two-level lateral trajectory control method of claim 18, further comprising calculating, by the control system, the desired steering torque using a steering model and based on the sliding surface value and reaching phase gains.

20. The cascaded two-level lateral trajectory control method of claim 11, wherein the TTC is an autonomous or advanced driver-assistance system (ADAS) feature of the vehicle.

* * * * *